United States Patent Office 3,352,842
Patented Nov. 14, 1967

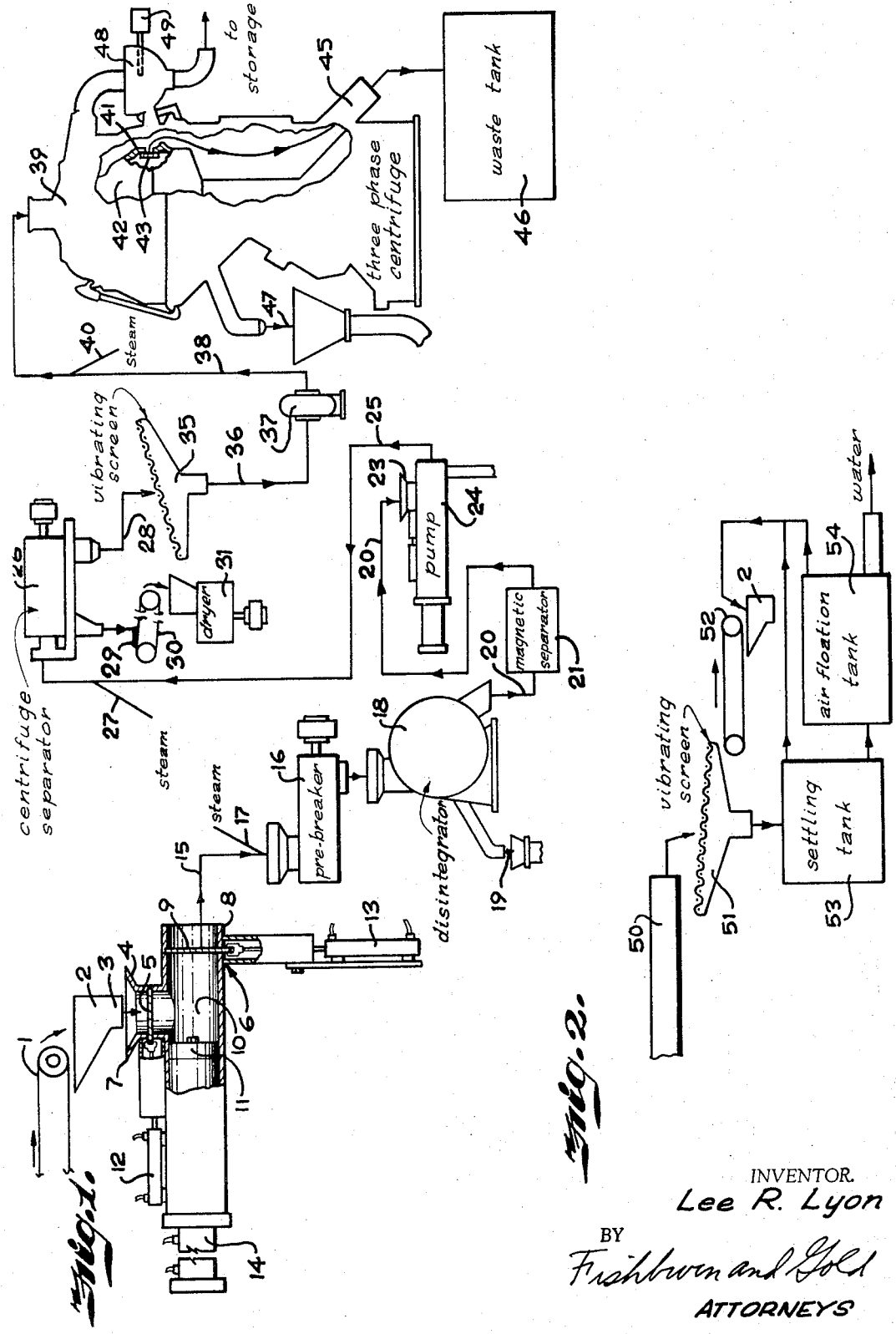

3,352,842
PROCESSING OF OFFAL OR THE LIKE FOR OB-
TAINING SEPARATED FAT AND PROTEIN MA-
TERIAL THEREFROM
Lee R. Lyon, Kansas City, Mo., assignor to Lycoil, Inc.,
Kansas City, Mo., a corporation of Missouri
Filed Mar. 16, 1964, Ser. No. 352,017
7 Claims. (Cl. 260—112)

ABSTRACT OF THE DISCLOSURE

The processing of raw poultry and animal offal for recovery of oils and low fat content solids therefrom. The offal is obtained in a raw or uncooked state from a slaughtering point and moved to a grinder that reduces the size of solid particles whereby the offal can be moved in a stream to a centrifugal separator with the offal in the stream being heated by introducing steam into said stream to raise the temperature to approximately 180° F. to 190° F. The heated offal is then centrifugally separated into solids and liquids with the solids being dried into a cake. The liquids are flowed in the stream and reheated by introducing steam therein to approximately 180° F. to 200° F. and then centrifugally separated in a three-phase separation into oil, water, and sludge.

The present invention contemplates the processing of poultry or animal offal which includes substantially all of the inedible materials from the slaughter of poultry, with the exception of the feathers, or in other words, the heads, feet, innards including intestinal tract, as well as whole birds which have been rejected for one reason or another as not being suitable for an edible product. The offal from the slaughter of animals includes substantially all of the inedible material resulting from the slaughter of animals with the exception of hides. The invention further contemplates what may be termed low temperature rendering of raw or uncooked offal and the like from packing plants; also, that such material may arrive for processing in various ways, for example on a conveyor belt in a relatively dry state or just as it comes from the poultry or animal, or it may be supplied in a sluice of water where the water is used to remove the offal. In such cases, the relatively dry material and the material having low water content will be processed as is but if the quantity of water is great the material will be subjected to a screening or other treatment to reduce the quantity of the water from the material to be processed for economy in the processing.

Offal resulting from the slaughter of poultry or animals contains fats or oils and also proteins that may have value when recovered; however, there are many problems in handling the material, as for example, in many cases the heads of poultry are shrouded with plastic blinders and the legs of poultry often carry with them a band of plastic that can interfere with proper movement of the material as by pumps and the like. While offal has heretofore been subjected to processes for recovery of usable products therefrom, such processes used high temperature rendering methods which had a detrimental effect upon recovered fats or were inefficient or uneconomical due to slow recovery rates and failure to extract sufficient of the fats to provide low fat content of recovered protein materials.

The principal objects of the present invention are to provide for the processing of animal or poultry offal to obtain and separate fats in the form of oil or grease and protein material or solids without high temperature rendering; to provide such a process wherein poultry or animal offal in a fresh state is reduced to a small particle size and subjected to heat of short duration to facilitate movement through passages and apparatus with the heat being maintained of a degree and duration generally considered insufficient for cooking or rendering of the material; to provide such a process wherein the reduced material is moved through separation stages to separate solids from liquid phases and from intermediary phases in a low temperature recovery of fats for producing a fat product of a high state of purity, excellent color and low moisture content; to provide such a process wherein protein materials of relatively low fat concentrations are produced and separated to form an intermediary product particularly suited for further processing or conversion by enzymatic digestion; to provide offal handling and processing apparatus for moving raw material through a reducing stage and separating stages in a substantially continuous process at a uniform rate for low temperature recovery and separation of fats and protein materials therefrom; and to provide such a process and apparatus which permits efficient handling of poultry or animal offal and economic recovery of usable materials therefrom.

Other objects and advantages of this invention will become apparent from the following description taken in connection with the accompanying drawings wherein are set forth by way of illustration and example certain embodiments of this invention.

FIG. 1 is a schematic flow diagram showing the various treating steps to which the offal material is subjected in recovering and separating fats and protein materials therefrom.

FIG. 2 is a schematic flow diagram showing the initial treating steps for offal having a high water content.

Referring more in detail to the drawings:

The reference numeral 1 indicates suitable apparatus for movement of animal or poultry offal from a place of slaughter (not shown) to a processing system. In instances where the offal is in a relatively dry state, the apparatus 1 may be a conveyor or duct and in the illustrated system is in the form of a conveyor belt moving the offal to a hopper or funnel means 2 having a discharge duct 3 leading to an inlet connection 4 provided with a sliding inlet valve 5 of an offal pump 6. If the offal is removed from the slaughtering point by water, the apparatus 1 or conveyor may be a duct having a sluice of water and, if the water is not in too great a quantity, it would be delivered to the hopper 2 for movement to the pump 6 substantially in the same manner as the relatively dry state offal. If the quantity of water is too great for economic processing, the liquid and offal in the preliminary stage of the treatment would be handled differently, as later described.

The pump 6 is of a design to prohibit the fouling thereof with viscous, stringy or large particle material, and preferably is of the reciprocating cylinder type with large inlet and outlet ports 7 and 8 respectively controlled by the inlet valve 5 and outlet valve 9 so as to present substantially unobstructed openings for movement of solid, semi-solid, stringy and viscous portions of the offal to and from the pump cylinder 10. The valves 5 and 9 may each be operated in timed relation with the reciprocation of the piston 11 in the cylinder 10 by means of suitable power such as pneumatic cylinders 12 and 13 respectively. The piston 11 is reciprocated by suitable power as by a pneumatic cylinder 14. The pump 6 receives the offal from the duct 3 and pumps same through a flow line 15 to a pre-breaker 16. The flow of raw uncomminuted offal, which in the case of poultry offal, includes substantially all inedible materials from the slaughter of the poultry except for the feathers. In other words, the material may include heads, feet, innards including intestinal tracts, gizzards, etc., and even whole birds which may have been rejected for one reason or another as not being suitable for an edible product. This flow of raw uncomminuted offal is subject to heat to increase the temperature thereof to about 150 degrees to 160 degrees F. as it enters the pre-breaker 16. The heating is provided by sparging steam into the flow line 15 by means of a temperature-responsive steam sparging connection 17. This allows the steam to enter the material and become mixed therewith in the pre-breaker 16.

The pre-breaker disintegrator 16 may be such as a Reitz model 10–H2236 (Santa Rosa, Calif.), arranged whereby material is broken or reduced in size to be handled by subsequent apparatus in the system. From the pre-breaker 16, the offal is moved or introduced into a disintegrator 18 of the type manufactured by Reitz, Model RD112–H32, and adapted to remove substantially ungrindable solid particles by screen separation and comminute the remainder to a particle not greater than about ½ inch. However, it is to be understood that in such installations the screen size may be as small as ¼ inch for additional reduction of particle size delivered from the disintegrator. The ungrindable material is discharged as at 19 and discarded. It is to be understood that the pre-breaker 16 and disintegrator 18 may be separate pieces of machinery or they may be a combination machine that will both break the bones and large particles and also comminute the remainder to reduce same to small size particles.

The comminuted offal is discharged from the disintegrator through a flow line 20 which preferably has a magnetic separator 21 therein for removal of metal particles from said offal passing therethrough. The comminuted offal in the flow line 20 is cooled in passage through the pre-breaker and disintegrator and preferably should not have a temperature of over 150 degrees F. as it leaves the disintegrator 18, it being desirable to keep the poultry or animal offal at as low a temperature as possible for as much of the process as is possible. The flow line 20 is connected to an inlet 23 of a pump 24 which may be generally of the reciprocating type having large inlet and outlet ports with sliding valves such as pump 6. However, due to the smaller particle size of the material handled by the pump 24, it may be smaller in size than the pump 6 and provide substantially continuous flow.

The comminuted offal is continuously pumped by means of the pump 24 through a flow line 25 to a scroll type of centrifugal separator 26. It is desirable that the pump 24 be of the reciprocating large port sliding valve type for the reason that the product may contain bone pieces and frequently the legs of poultry carry with them a band of plastic or the heads may be surrounded in plastic blinders which present problems in pumping and may stop up or jam a conventional pump. The offal from the discharge of the pump 24 flowing through the line 25 is subjected to heat to raise the temperature of the material in the flow line 25 to approximately 180 to 190 degrees F. just prior to entering the scroll type centrifuge 26. The reheating of the offal material, in the illustrated system, is by sparging steam into the flow line 25 between the pump 24 and the centrifuge 26. The steam is supplied to the flow line 25 by a temperature-responsive steam sparging connection or live steam injection unit 27.

The centrifuge or centrifugal separator 26 is of the type manufactured by Byrd, Model 18X28 (Walpole, Mass.), and is adapted to separate flowable liquids from heavier solids or semi-solids of the type which may pass through the disintegrator 18. The liquid stream from the centrifuge 26 is continuously released therefrom for flow through a duct 28 as later described. The solids from the centrifuge may contain fibrous material, protein and the like, and the oil normally associated therewith is largely displaced in the centrifuge 26 with the greater density water in the solids whereupon the oil is forced into and remains with the flowable liquid portion discharged in the flow line 28.

The heavier solids or semi-solids are discharged in the form of a wet cake at 29 to a conveyor 30 for delivery to a suitable dryer 31 preferably a direct fired rotary type drum dryer for drying the solids or cake to a salable condition. It is one of the features of the present process that the amount of fat in the poultry offal solids is reduced whereby said solids may be easily digested through enzymatic digestion. It is found that in the processing the percentage of fat is reduced whereby the fat remaining in the solids delivered as at 29 is less than 15 percent and preferably about 10 percent on a dry basis. This reduction is obtained without subjecting the material to any high temperature for any prolonged period of time. The resultant wet cake from the centrifuge 26 having been processed raw and at relatively low temperatures, may be immediately introduced into enzymatic reduction tanks where by the addition of certain catalytic agents and the application of increased temperature the material can be digested in order to produce a more valuable protein end product. The intermediary product in the form of the cake delivered at 29 from the centrifuge or separator 26 or from the drier 31, due to the fact that the fat is substantially eliminated from the protein materials without materially changing the protein material or subjecting them to high temperatures, results in a low fat concentration material ideally suited for enzymatic digestion, eliminating the difficulties that have heretofore been experienced therein because of fat content in the material being processed.

The flowable or liquid phase of the offal material is discharged through the flow line or duct 28 to a vibrating screen or the like 35 of approximately 20 mesh to remove remaining solid or semi-solid particles of a size which may clog or damage equipment used later in the process. The flowable liquids and fine solids and semi-solids remaining in the liquid are directed from the vibrating screen 35 through a flow line 36 to a pump 37. The flowable offal material is then pumped by the pump 37 through a flow line 38 into a three-phase centrifuge 39. The flowable offal material in the flow from the screen 35 to the three-phase centrifuge 39 is preferably reheated to raise the temperature to approximately 180 degrees F. to 200 degrees F. In the system illustrated, the reheating is by sparging steam into the flow line 38 between the pump 37 and the centrifuge 39 by a temperature-responsive steam sparging connection 40.

The three-phase centrifuge 39 is of the type known as Titan CNS70 (Pfaudler Permutit, Rochester, N.Y.) wherein the outer face 41 of the bowl 42 therein periodically opens by withdrawing a gate 43 to discharge all bowl contents. This is in contrast to the more common multiple phase centrifuge which uses nozzles to continuously discharge particular phases of the bowl contents. The centrifuge 39 is required because even after the various steps of the process above-described heavy solid fines and interfacial solid fines still make up a significant part of the offal remainder. The heavy solid fines may tend to clog up a nozzle type centrifuge. More troublesome, however, are the interfacial solid fines which tend to collect between the oil and water phase in the bowl and eventually stop oil production. To prevent this, the entire bowl contents are periodically discharged at 45 into a waste receiver 46. The water in the offal is separated and dicharged at 47 and the valuable oil is collected at 48. A purity control probe 49 is connected to the oil collection point 48 and is arranged whereby if the oil being recovered is rancid or not of desired quality the probe causes the centrifuge to dump its contents. This aids in assuring high quality oil recovery.

Heretofore, the efficient removal of the interfacial particles constituted a serious problem. One method has been to use a surfactant which causes the interfacial particles to settle out. Another method requires the addition of large quantities of water which increases the amount of heat required. However, these methods are significantly more expensive and less efficient than the above-described process. Also, the shortness of the time duration in which the offal is subjected to heat is an advantage. Heat is applied in the flow in portions of the travel of the offal in the process and for travel from the hopper 2 to the oil collection point 48 only requires 10 to 15 minutes. This eliminates the reduction in quality that occurs in prior processes where the offal was subjected to heat for long periods, as for example two to three hours. Reasonably low temperatures are used throughout the instant process to prevent a deterioration of the final product, both as to the cake of solids from the centrifuge 26 and the oil recovered at 48. The offal is moved through the various steps substantially continuously, avoiding the likelihood of overtreating certain portions of the offal which is inherent in known batch processes. Further, due to the unique pump for handling the raw uncomminuted offal and the substantially continuous operating machines performing the steps of the process, few personnel are required and yet high speed efficient operation is not sacrificed. If the offal at the slaughtering point is removed by water in a substantial quantity, the preliminary handling is by a system portion shown in FIG. 2. The offal is moved or flowed through a duct or sluice 50 to a vibrating screen 51 to remove the excess liquid from the solid material, the solid material being discharged as at 52 to the hopper 2 for further processing in the same manner as illustrated and described relative to the system shown in FIG. 1. The liquid material from the vibrating screen 51 is delivered to a settling tank 53. It is then flowed to an air flotation tank 54 and in both of the settling tank 53 and air flotation tank 54 the fatty materials are skimmed therefrom and delivered to the hopper 2 for flow to a pump and processing with the solid material. The water from the settling tank and air flotation tank may be recirculated back to the slaughtering plant or discarded to a sewer.

It is to be understood that while certain forms of this invention have been illustrated and described, it is not to be limited to the specific form herein described and shown except insofar as such limitations are included in the claims.

What I claim and desire to secure by Letters Patent is:

1. The process of treating raw poultry and animal offal and recovering oils and low fat content protein solids therefrom consisting of the steps: conveying raw fresh offal from a slaughtering point, reducing the size of solids in said offal, moving said offal in a stream, subjecting the offal with the reduced size particles to heat by introducing steam into said stream to raise the temperature to approximately 180° F. to 190° F. to reduce the viscosity of the oils contained in the solids, centrifugally separating said heated offal into a flowable liquid phase and a solid phase, with the fats normally associated with the solids being largely displaced therefrom and forming a part of the liquid phase, and drying said solid phase from said centrifugal separation to remove water and form a cake having a fat content of less than 15% by weight on a dry basis.

2. The process as set forth in claim 1 wherein the offal is subjected to heat before reduction of the solids therein by introducing steam as it is moved to the point of reduction to raise the temperature of said offal to approximately 150° F. to 160° F.

3. The process as set forth in claim 1 including the steps of: flowing the liquid phase from said centrifugal separation in a stream, reheating said flowable liquid phase by introducing steam into the stream thereof to raise the temperature of the liquid phase to approximately 180° F. to 200° F., and then centrifugally separating said heated flowable liquid phase into oil, water and sludge, and collecting said oil.

4. The process as set forth in claim 1 including the steps of screening the flowable liquid phase from the centrifugal separation to substantially remove remaining solids and semi-solid particles, flowing the remaining liquids in a stream, reheating said flowing liquids by introducing steam into the stream thereof to raise the temperature of said liquids to approximately 180° F. to 200° F., and then centrifugally separating said heated liquids into oil, water and sludge, and collecting said oil.

5. The process as set forth in claim 1 wherein the offal processed therein is obtained by conveying from a slaughtering point with water, screening said offal to separate solids from liquids, collecting said liquids, gravity separating said liquids into fats and water, removing said fats and mixing same with said screened solids to form the offal subjected to the size reduction.

6. The process as set forth in claim 5 wherein the offal is subjected to heat before reduction of the solids therein by introducing steam as it is moved to the point of reduction to raise the temperature of said offal to approximately 150° F. to 160° F.

7. The process as set forth in claim 6 and including the steps of screening the flowable liquid phase from the centrifugal separation to substantially remove remaining solids and semi-solid particles, flowing the remaining liquids in a stream, reheating said flowable liquids by introducing steam into the stream thereof to raise the temperature of the liquid phase to approximately 180° F. to 200° F., and then centrifugally separating said heated flowable liquid phase into oil, water and sludge, and collecting said oil.

References Cited

UNITED STATES PATENTS

| 2,667,500 | 1/1954 | Mortenson | 260—412.6 |
| 2,697,113 | 12/1954 | Kramer | 260—412.6 |
| 2,745,856 | 5/1956 | Dayen et al. | 260—412.6 |
| 2,823,214 | 2/1958 | Sharples | 260—412.6 |
| 2,875,222 | 2/1959 | Dormitzer | 260—412.6 |
| 3,046,286 | 7/1962 | Speer et al. | 260—412.6 |
| 3,114,638 | 12/1963 | Huhn et al. | 99—7 |
| 3,141,774 | 7/1964 | Little | 99—18 |
| 3,282,972 | 11/1966 | Merlis | 260—412.6 |

FOREIGN PATENTS

| 536,732 | 2/1957 | Canada. |

WILLIAM H. SHORT, *Primary Examiner.*

H. SCHAIN, *Assistant Examiner.*